United States Patent
Wurmfeld

(10) Patent No.: US 11,171,952 B2
(45) Date of Patent: *Nov. 9, 2021

(54) SYSTEMS AND METHODS FOR USING MICRO ACCELERATIONS AS A BIOMETRIC IDENTIFICATION FACTOR

(71) Applicant: CAPITAL ONE SERVICES, LLC, McLean, VA (US)

(72) Inventor: David Wurmfeld, Falls Church, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/775,475

(22) Filed: Jan. 29, 2020

(65) Prior Publication Data
US 2020/0169551 A1 May 28, 2020

Related U.S. Application Data

(63) Continuation of application No. 16/390,448, filed on Apr. 22, 2019, now Pat. No. 10,587,615, which is a (Continued)

(51) Int. Cl.
*H04L 29/06* (2006.01)
*G06F 21/31* (2013.01)
(Continued)

(52) U.S. Cl.
CPC .......... *H04L 63/0861* (2013.01); *G06F 21/31* (2013.01); *G06F 21/554* (2013.01);
(Continued)

(58) Field of Classification Search
CPC ............ H04L 63/0861; H04L 63/0853; H04L 63/102; H04L 63/107; G06F 21/31;
(Continued)

(56) References Cited

U.S. PATENT DOCUMENTS

| 6,647,408 B1 | 11/2003 | Ricart et al. |
| 6,721,738 B2 | 4/2004 | Verplaetse et al. |

(Continued)

FOREIGN PATENT DOCUMENTS

| KR | 1020180050127 | 5/2018 |
| WO | WO 2014/203163 A1 | 12/2014 |

OTHER PUBLICATIONS

Sharma et al., "Frequency based classification of activities using accelerometer data" Aug. 2008, IEEE, pp. 150-153, https://ieeexplore.ieee.org/stamp/stamp.jsp?tp=&arnumber=4648056 (Year: 2008).

*Primary Examiner* — Techane Gergiso
(74) *Attorney, Agent, or Firm* — Perkins Coie LLP

(57) ABSTRACT

Systems and methods for using micro accelerations as a biometric factor for multi-factor authentication, the method including receiving, filtering, and determining an identifying pattern from micro acceleration data representative of the user, storing the identifying pattern for later use in authenticating the identity of the user, and using the identifying pattern as one factor in a multi factor authentication.

19 Claims, 6 Drawing Sheets

Related U.S. Application Data continuation of application No. 16/001,930, filed on Jun. 6, 2018, now Pat. No. 10,284,552.

(51) Int. Cl.
| | |
|---|---|
| *G06F 21/55* | (2013.01) |
| *G06K 9/00* | (2006.01) |
| *G06Q 20/40* | (2012.01) |
| *H04W 12/06* | (2021.01) |

(52) U.S. Cl.
CPC ......... *G06K 9/00892* (2013.01); *G06Q 20/40* (2013.01); *H04L 63/0853* (2013.01); *H04L 63/102* (2013.01); *H04L 63/107* (2013.01); *H04W 12/06* (2013.01)

(58) Field of Classification Search
CPC ... G06F 21/554; G06F 3/017; G06K 9/00892; G06K 9/00335; G06K 9/00342; G06K 9/00348; G06K 9/00355; G06Q 20/40; H04W 12/06
See application file for complete search history.

(56) References Cited

U.S. PATENT DOCUMENTS

| | | |
|---|---|---|
| 9,127,946 B1 | 9/2015 | Menon et al. |
| 9,426,139 B1 | 8/2016 | McClintock et al. |
| 9,762,581 B1 | 9/2017 | Wang et al. |
| 2008/0175443 A1 | 7/2008 | Kahn et al. |
| 2011/0159850 A1* | 6/2011 | Faith .................. G06Q 30/0201 455/411 |
| 2011/0189981 A1* | 8/2011 | Faith ...................... G06Q 20/40 455/414.1 |
| 2012/0164978 A1 | 6/2012 | Conti et al. |
| 2012/0278155 A1* | 11/2012 | Faith .................. G06K 9/00221 705/14.26 |
| 2013/0084797 A1* | 4/2013 | Avadhanam ........ G06F 9/44505 455/41.1 |
| 2013/0103344 A1* | 4/2013 | Bye ........................ G01C 21/16 702/150 |
| 2013/0228616 A1 | 9/2013 | Bhosle et al. |
| 2013/0261423 A1 | 10/2013 | Herrala et al. |
| 2015/0006378 A1* | 1/2015 | Blythe ............... G06K 19/0716 705/41 |
| 2015/0109124 A1 | 4/2015 | He et al. |
| 2015/0112603 A1 | 4/2015 | Zhong |
| 2016/0226865 A1* | 8/2016 | Chen .................... G06Q 20/306 |
| 2016/0232726 A1* | 8/2016 | Zizi ........................ G07C 13/00 |
| 2016/0234174 A1* | 8/2016 | Zizi ...................... H04L 63/0815 |
| 2017/0018001 A1* | 1/2017 | Tunnell ................. H04L 67/306 |
| 2017/0115782 A1* | 4/2017 | Hinckley ............... H04N 5/225 |
| 2017/0124445 A1 | 5/2017 | Howard |
| 2017/0286789 A1* | 10/2017 | Wintergerst Lavin ...................... G06K 9/00912 |
| 2017/0323166 A1* | 11/2017 | Colussi ............. G06K 9/00335 |
| 2019/0065918 A1* | 2/2019 | Humborstad ...... G06K 19/0718 |
| 2021/0090084 A1* | 3/2021 | Fisher ...................... G07F 7/08 |

\* cited by examiner

SYSTEMS AND METHODS FOR USING MICRO ACCELERATIONS AS A BIOMETRIC IDENTIFICATION FACTOR

CROSS-REFERENCE TO RELATED APPLICATIONS

This application is a continuation of U.S. application Ser. No. 16/390,448, which is a continuation of U.S. application Ser. No. 16/001,930, filed Jun. 6, 2018, which issued on May 7, 2019 as U.S. Pat. No. 10,284,552, and is entitled "SYSTEMS AND METHODS FOR USING MICRO ACCELERATIONS AS A BIOMETRIC IDENTIFICATION FACTOR." The disclosures of the above-referenced applications are expressly incorporated herein by reference in their entireties.

TECHNICAL FIELD

The disclosed embodiments generally relate to systems and methods for using micro accelerations as a biometric identification factor for authentication using an electronic transaction card or other user device.

BACKGROUND

Multi-factor authentication is a method of confirming a user's identity only after successfully presenting two or more factors to an authentication mechanism. The factors may include: knowledge, something the user and only the user knows; possession, something the user and only the user has; and inherence, something the user and only the user is. Two-factor authentication is one type of multi-factor authentication. It is a method of confirming a user's claimed identity by utilizing a combination of two factors. For example, a two factor authentication may be required for withdrawing money from an automated teller machine: only the correct combination of a bank card, something that the user possesses, and a personal identification number, something that the user knows, allows the automated teller transaction to be carried out.

As something inherent to the user, biometric factors are being increasingly used as one factor in a multi-factor authentication process because biometrics cannot easily be replicated or stolen by a third party. Physical attributes like voice, smell, fingerprints, heartbeats, facial recognition, hand geometry, and retina scanning are examples of currently used biometric factors. These factors, however, require obtrusive methodologies to be successfully used as one factor in a multi-factor authentication. For example, fingerprints and retina scans require a user to take time and effort to supply their finger or eye to an authentication mechanism. Because individuals come in a wide variety of sizes, supplying a finger or head to the authentication mechanism can be inconvenient. There is currently a need for less obtrusive biometric factors to use in multi-factor authentication processes.

SUMMARY

The disclosed embodiments describe systems and methods for using micro accelerations as a biometric identification factor for authentication.

In one embodiment, a system for using micro accelerations as a biometric identification factor for authentication using an electron transaction card includes one or more memory devices storing software instructions, one or more accelerometers, and one or more processors configured to execute software instructions to: receive micro acceleration data collected by the one or more accelerometers, filter the micro acceleration data, wherein the filtered micro acceleration data is representative of a user, determine an identifying pattern from the filtered micro acceleration data representative of the user, store the identifying pattern for later use in authenticating the identity of the user, and use the identifying pattern as one factor in a multi factor authentication to authenticate the identity of the user.

In another embodiment, a method for using micro accelerations as a biometric identification factor for authentication using an electronic transaction card includes receiving micro acceleration data collected by one or more accelerometers, filtering the micro acceleration data, wherein the filtered micro acceleration data is representative of a user, determining an identifying pattern from the filtered micro acceleration data representative of the user, storing the identifying pattern for later use in authenticating the identity of the user, and using the identifying pattern as one factor in a multi factor authentication for authenticating the identity of the user.

In another embodiment, a non-transitory computer-readable storage medium storing instructions that are executable by at least one processor to perform a method for using micro accelerations as a biometric identification factor for authentication using an electronic transaction card. The method includes receiving micro acceleration data collected by one or more accelerometers, filtering the micro acceleration data, wherein the filtered micro acceleration data is representative of a user, determining an identifying pattern from the filtered micro acceleration data representative of the user, and storing the identifying pattern for later use in authenticating the identity of the user.

In one embodiment, a system for using micro accelerations as a biometric identification factor for authentication using a mobile device includes one or more memory devices storing software instructions, one or more accelerometers, and one or more processors configured to execute software instructions to: receive micro acceleration data collected by the one or more accelerometers, filter the micro acceleration data, wherein the filtered micro acceleration data is representative of a user, determine an identifying pattern from the filtered micro acceleration data representative of the user, store the identifying pattern for later use in authenticating the identity of the user, and use the identifying pattern as one factor in a multi factor authentication to authenticate the identity of the user.

In another embodiment, a method for using micro accelerations as a biometric identification factor for authentication using a mobile device includes receiving micro acceleration data collected by one or more accelerometers, filtering the micro acceleration data, wherein the filtered micro acceleration data is representative of a user, determining an identifying pattern from the filtered micro acceleration data representative of the user, storing the identifying pattern for later use in authenticating the identity of the user, and using the identifying pattern as one factor in a multi factor authentication for authenticating the identity of the user.

In another embodiment, a non-transitory computer-readable storage medium storing instructions that are executable by at least one processor to perform a method for using micro accelerations as a biometric identification factor for authentication using a mobile device. The method includes receiving micro acceleration data collected by one or more accelerometers, filtering the micro acceleration data, wherein the filtered micro acceleration data is representative of a user, determining an identifying pattern from the filtered micro acceleration data representative of the user, and storing the identifying pattern for later use in authenticating the identity of the user.

It is to be understood that both the foregoing general description and the following detailed description are exemplary and explanatory only and are not restrictive of the disclosed embodiments, as claimed.

BRIEF DESCRIPTION OF THE DRAWING

The accompanying drawings, which are incorporated in and constitute a part of this specification, illustrate disclosed embodiments and, together with the description, serve to explain the disclosed embodiments. The drawings are not exhaustive. Instead, emphasis is generally placed upon illustrating the principles of the disclosed embodiments described herein. In the drawings.

DETAILED DESCRIPTION

Reference will now be made in detail to the disclosed embodiments, examples of which are illustrated in the accompanying figures. The disclosed systems and methods relate to using micro accelerations as a biometric identification factor for authentication using an electronic transaction card or other device.

The term "micro acceleration" as used herein refers to acceleration measurements compared to the acceleration due to gravity. For example, micro accelerations may refer to acceleration measurements as small as $1 \times 10^{-6}$ m/s$^2$.

The term "transaction card," as used herein may refer to a physical product that is configured to provide information, such as financial information (e.g., card numbers, account numbers, etc.), quasi-financial information (e.g., rewards balance, discount information, etc.) and/or individual-identifying information (e.g., name, address, etc.), when the card is read by a card reader. Examples of transaction cards include credit cards, debit cards, gift cards, rewards cards, frequent flyer cards, merchant-specific cards, discount cards, identification cards, membership cards, and driver's licenses, but are not limited thereto. The physical properties of the transaction card (e.g., size, flexibility, location of various components included in the card) may meet various international standards, including, e.g., ISO/IEC 7810, ISO/IEC 7811, ISO/IEC 7812, ISO/IEC 7813, ISO/ISC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

Disclosed embodiments include transaction cards and systems and methods for authenticating the user of the transaction card or other devices.

Figure 1:
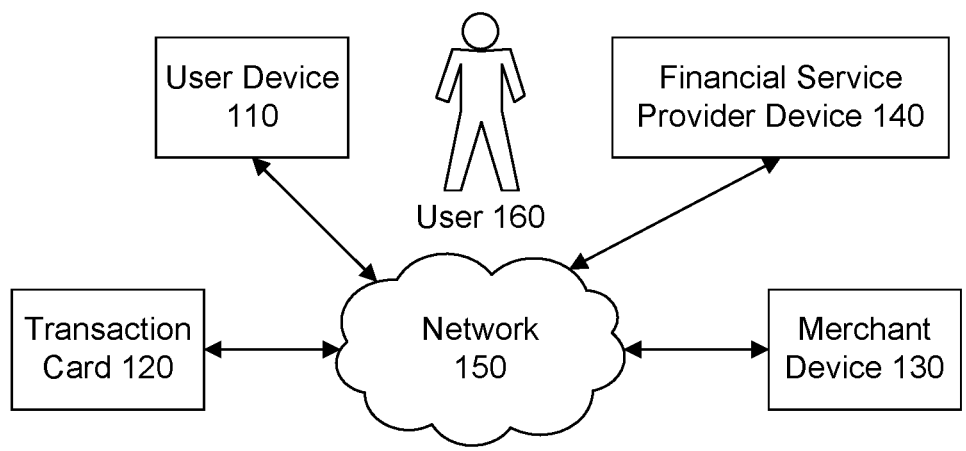
FIG. 1 is a block diagram of an exemplary system, consistent with the disclosed embodiments.

FIG. 1 is a block diagram illustrating an exemplary system 100, consistent with the disclosed embodiments that may be configured for performing authentication consistent with the disclosed embodiments. As shown, system 100 includes a user device 110, a transaction card 120, a merchant device 130, a financial service provider device 140, all of which are communicatively coupled by a network 150. While only one user device 110, transaction card 120, merchant device 130, and financial service provider device 140 are shown, it will be understood that system 100 may include more than one user device 110, transaction card 120, merchant device 130, and financial service provider device 140.

Each of devices 110-140 may be a computing system configured to provide, use, and/or process user data. As further described herein, devices 110-140 may include one or more computing devices (e.g., computer(s), server(s), embedded systems), and memory storing data and/or software instructions (e.g., database(s), memory devices). In some embodiments, the one or more computing devices are configured to execute software instructions stored on one or more memory devices to perform one or more operations consistent with the disclosed embodiments. Each of devices 110-140 may be configured to communicate with one or more of devices 110-140. In certain aspects, users may operate one or more of devices 110-140 to initiate one or more operations consistent with the disclosed embodiments. For example, user device 110 may be operated by a user 160. User 160 may be an owner/operator of user device 110 and/or transaction card 120, such as a customer of one or more entities associated with devices 130 and 140. In other aspects, user 160 may be an employee of, or associated with, the entity corresponding to transaction card 120 and/or merchant device 130 (e.g., someone authorized to use the underlying computing systems or otherwise act on behalf of the entity). In other aspects, user 160 may not be an employee or otherwise associated with the underlying entity. In some aspects, user 160 may be an entity, rather than an individual(s), associated with the respective device 130 or 140.

User device 110 may be one or more computing devices configured to execute software instructions for performing one or more operations consistent with the disclosed embodiments. In one embodiment, user device 110 may be a mobile device (e.g. tablet, smartphone, etc.), a desktop computer, a laptop, a server, a wearable device (eyeglasses, a watch, etc.), and/or device dedicated hardware device. User device 110 may include one or more processors configured to execute software instructions stored in memory, such as memory included in user device 110. User device 110 may include software that, when executed by a processor, performs known Internet-related communication and content display processes. For instance, user device 110 may execute browser software that generates and displays interface screens including content on a display device included in, or connected to, user device 110. The disclosed embodiments are not limited to any particular configuration of user device 110. For instance, user device 110 may be a mobile device that stores and executes mobile applications that provide financial-service-related functions offered by a financial service provider; such as an application associated with one or more financial accounts that a user (e.g., user 160) holds with a financial service provider.

In one embodiment, user 160 uses device 110 to perform one or more operations consistent with the disclosed embodiments. In one aspect, user 160 may be a customer or potential customer of a merchant associated with merchant device 130. For instance, user 160 may transact business with the merchant associated with merchant device 130. In another aspect, user 160 may be a customer of a financial service provider associated with financial service provider device 140. For instance, the financial service provider may maintain a financial service account (e.g., checking account, credit account, or the like) for user 160.

Transaction card 120 is associated with user 160. In some embodiments, transaction card 120 may include a data storage component disposed in the card. As used herein, a "data storage component" may be or include one or more devices configured to receive, store, process, provide, transfer, send, delete, and/or generate data or other information. For example, the data storage component may include a microchip (e.g., EMV chip), a communication component or device (e.g., Near Field Communication (NFC) antenna, radiofrequency identification (RFID) device, Bluetooth® device, WiFi device), a magnetic strip, a barcode, a Quick Response (QR) code, and/or other devices. The data storage component may be configured to store information in a computer-readable format. For example, the data storage component may be configured to store information in a format that can be read by merchant device 130, transmitted over network 150, and read or processed by financial service provider device 140.

Merchant device 130 may include one or more computer systems associated with a merchant. For example, merchant device 130 may be associated with an entity that provides goods and/or services, e.g., a retail store. The merchant may include brick-and-mortar location(s) that a user e.g., user 160, may physically visit to purchase goods and services using a transaction card, e.g., transaction card 120. Such physical locations may include computing devices (e.g., merchant device 130) that perform financial service transactions with customers (e.g., POS terminal(s), kiosks, etc.). Additionally or alternatively, merchant device 130 may be associated with a merchant that provides an electronic shopping environment, such as a website or other online platform that consumers may access using a computer through a browser, a mobile application, or similar software. Merchant device 130 may include a client device, such as a laptop computer, desktop computer, smart phone, or tablet, which a user may operate to access the electronic shopping mechanism.

Financial service provider device 140 may be associated with a financial service provider. The financial service provider may be a bank, credit union, credit card issuer, or other type of financial service entity that generates, provides, manages, and/or maintains financial service accounts for one or more users (e.g., user 160). Financial service accounts may include, for example, checking accounts, and any other types of financial service accounts known to those skilled in the art. Financial service accounts may be associated with electronic accounts, such as a digital wallet or similar account that may be used to perform electronic transactions, such as purchasing goods and/or services online. Financial service accounts may also be associated with physical financial service account cards, such as a debit or credit card (e.g., transaction card 120) that user 160 may carry on their person and use to perform financial service transactions, such as purchasing goods and/or services at a point of sale terminal (e.g., merchant device 130).

The financial service provider includes infrastructure and components that are configured to generate and provide financial service accounts and financial service account cards (e.g., debit cards, credit cards). The financial service provider may also include infrastructure and components that are configured to manage transactions associated with a customer service account. In certain aspects, financial service provider device 140 may include one or more computing devices configured to communicate with user device 110, transaction card 120, and merchant device 130 via network 150 to execute processing steps associated with authenticating the identity of user 160.

In certain aspects, the financial service provider associated with financial service provider device 140 may provide a primary financial service to a customer, e.g., user 160. For example, the financial service provider may maintain a credit card account with user 160, in a manner known in the art. In addition to the primary service (e.g., credit card account), the financial service provider may also provide additional services to user 160 to authenticate the identity of user 160. These additional services may include, for example, authenticating the identity of user 160. If transaction card 120 is not in the possession of user 160, a push notification may be sent to user device 110. For example, if transaction card 120 is not in possession of user 112 or a different user that user 112 has given authorization to possess transaction card 120, a text message may be sent to user device 110. User 160 may have options to temporarily freeze a credit line associated with user 160 and transaction card 120, consistent with the user's instructions. For example, the credit line may be frozen while user 160 remains out of possession of transaction card 120. Consistent with disclosed embodiments, components of system 100 may cooperate over network 150 to authenticate user 160.

Network 140 may be any type of network configured to provide communications between components of system 100. For example, network 140 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 100. In other embodiments, one or more components of system 100 may communicate directly through a dedicated communication link(s) (not shown), such as a link between user device 110 and merchant device 130.

Figure 2:
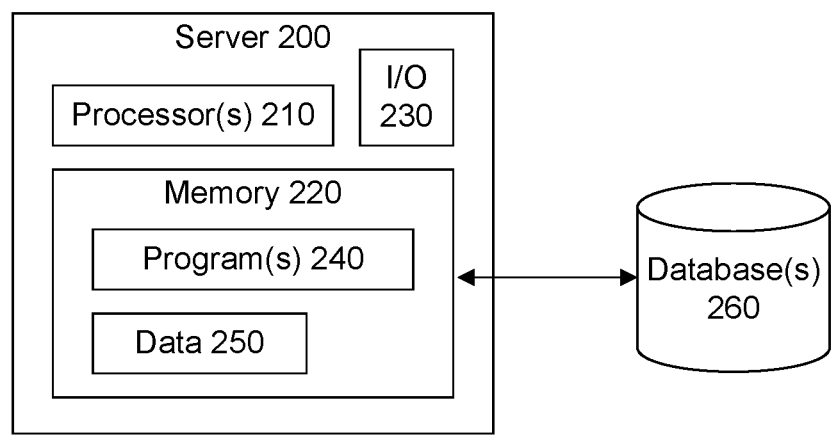
FIG. 2 is a block diagram of an exemplary server, consistent with the disclosed embodiments.

FIG. 2 is an exemplary block diagram of a server 200 for implementing embodiments consistent with the present disclosure. Variations of server 200 may be used by user device 110, transaction card 120, merchant device 130, and financial service provider device 140.

In one embodiment, server 200 includes one or more processors 210, one or more memories 220, and one or more input/output (I/O) devices 230. According to some embodiments, server 200 may be an embedded system or similar computing device consistent with disclosed embodiments. Server 200 may be standalone, or it may be part of a subsystem, which may be part of a larger system. For example, server 200 may represent distributed servers that are remotely located and communicate over a network (e.g., network 150) or a dedicated network, such as a LAN. Server 200 may correspond to any of merchant device 130 and financial service provider device 140.

Processor 210 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor 210 may include one or more known digital signal processors (DSP). The disclosed embodiments are not limited to any type of processor(s) otherwise configured to meet the computing demands required of different components of server 200.

Memory 220 may include one or more storage devices configured to store instructions executed by processor 210 to perform functions related to disclosed embodiments. For example, memory 220 may be configured with one or more software instructions, such as program(s) 240 that may perform one or more operations when executed by processor 210. The disclosed embodiments are not limited to separate programs or computers configured to perform dedicated tasks. For example, memory 220 may include a single program 240 that embodies the functions of server 200, or program 240 could comprise multiple programs. Additionally, processor 210 may execute one or more programs located remotely from server 200. For example, user device 110, merchant device 130, and/or financial device 140, may, via server 200, access one or more remote programs that, when executed, perform functions related to certain disclosed embodiments. Memory 220 may also store data 250 that reflects any type of information in any format that server 200 may use in system 100 to perform operations consistent with the disclosed embodiments.

I/O device 230 may be one or more devices configured to allow data to be received and/or transmitted by server 200. I/O device 230 may include one or more digital and/or analog communication devices that allow server 200 to communicate with other machines and devices, such as other components of system 100.

Server 200 may also be communicatively connected to one or more database(s) 260, such as through network 150. Database(s) 260 may include one or more memory devices that store information and are accessed and/or managed through server 200. By way of example, database(s) 260 may include Oracle™ databases, Sybase™ database, or other relational databases or non-relational databases, such as Hadoop sequences files, HBase, or Cassandra. The databases or other files may include, for example, data and information related to the source and destination of a network request, the data contained in the request, etc. Systems and methods of the disclosed embodiments, however, are not limited to separate databases. In one aspect, system 100 may include database 260. Alternatively, database 260 may be located remotely from server 200. Database 260 may include computing components (e.g., database management system, database server, etc.) configured to receive and process requests for data stored in memory devices of database(s) 260 and to provide data from database 260.

Figure 3:
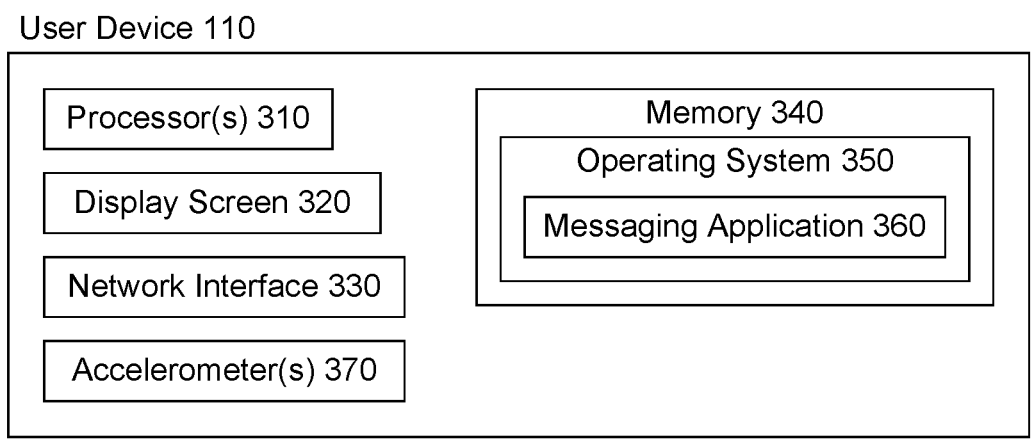
FIG. 3 is a block diagram of an exemplary user device, consistent with the disclosed embodiments.

FIG. 3 is an exemplary block diagram of user device 110 for implementing embodiments consistent with the present disclosure. User device 110 may be a mobile device with computing capabilities, such as a tablet, a smartphone, a wearable device, or any combination of these devices and/or affiliated components. As shown, user device 110 includes one or more processors 310, a display screen 320, a network interface 330, and one or more memory devices 340 storing one or more operating systems 350, including an inbuilt messaging application 360. User device 110 may also include one or more accelerometers 370.

Processor(s) 310 may include one or more known processing devices, such as a microprocessor from the Core™, Pentium or Xeon™ family manufactured by Intel™, the Turion™ family manufactured by AMD™, the "Ax" or "Sx" family manufactured by Apple™, or any of various processors manufactured by Sun Microsystems, for example. Processor(s) 310 may include one or more known digital signal processors (DSP). The disclosed embodiments are not limited to any type of processor(s) otherwise configured to meet the computing demands required of different components of user device 110.

Display screen 320 may include, for example, a liquid crystal display (LCD), a light emitting diode screen (LED), an organic light emitting diode screens (OLED), a touch screen, or other known display screens. Display screen 320 may display various kinds of information consistent with the disclosed embodiments.

Network interface 330 allows user device 110 to send and receive information through network 150. Alternatively or additionally, network interface 330 may establish direct wired or wireless connection between user device 110 and other system components, such as transaction card 120, merchant device 130, and/or financial service provider device 140.

Memory 340 may be, for example, a magnetic, semiconductor, tape, optical, removable, non-removable, or other type of storage device or tangible (e.g., non-transitory) computer readable medium. Memory 340 may store operating system 350, as well as data and mobile applications for performing operations consistent with functions described below.

Operating system 350 may perform known operating system functions when executed by processor(s) 310. By way of example, operating system 350 may include Android™, Apple OS X™, Unix™, Linux™, or others. Accordingly, examples of the disclosed embodiments may operate and function with computer systems running any type of operating system having an inbuilt messaging application. Messaging application 360, when executed by processor 310, provides text messaging communication via network 150.

Accelerometer(s) 370 may include one or more known accelerometers, such as micro electro mechanical (MEM) accelerometers, adapted for measuring micro accelerations. Accelerometer(s) 370 may include an NXP MMA8451Q accelerometer or variants of the NXP MMA8451Q accelerometer.

Figure 4:
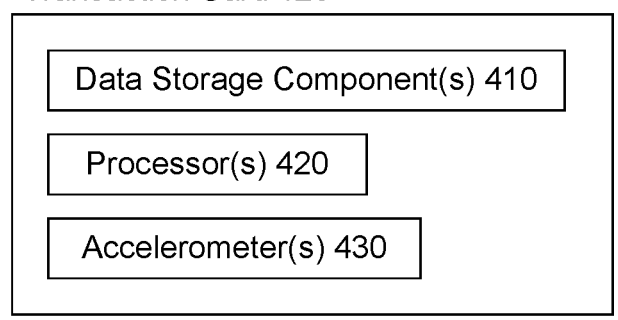
FIG. 4 is a block diagram of an exemplary transaction card, consistent with the disclosed embodiments.

FIG. 4 is an exemplary block diagram of transaction card 120. In some embodiments, transaction card 120 may include one or more data storage components 410, and one or more processors 420, and one or more accelerometers 430 disposed in the card. As used herein, a "data storage component" may be or include one or more devices configured to receive, store, process, provide, transfer, send, delete, and/or generate data or other information. For example, data storage component 410 may include a microchip (e.g., EMV chip), a communication component or device (e.g., Near Field Communication (NFC) antenna, radiofrequency identification (RFID) device, Bluetooth® device, WiFi device), a magnetic strip, a barcode, a Quick Response (OR) code, and/or other devices. Data storage component 410 may be configured to store information in a computer-readable format. For example, data storage device may be configured to store information in a format that can be read by merchant device 130, transmitted over network 150, and read or processed by financial service provider device 140 and/or user device 110.

Processor(s) 420 may include one or more known processing devices, such as a microprocessor from the Core™, Pentium or Xeon™ family manufactured by Intel™, the Turion™ family manufactured by AMD™, the "Ax" or "Sx" family manufactured by Apple™, or any of various processors manufactured by Sun Microsystems, for example. Processor(s) 420 may include one or more known digital signal processors (DSP).

Accelerometer 430 may include one or more known accelerometers, such as micro electro mechanical (MEM) accelerometers. Accelerometer 430 may include an NXP MMA8451Q accelerometer or variants of the NXP MMA8451Q accelerometer.

In other embodiments, the components of transaction card 120 may be incorporated into user device 110, such that user device 110 contains some or all the components of transaction card 120 and can perform the same functions, consistent with the disclosed embodiments. Such components that may be included in user device 110 include one or more digital signal processors and one or more MEM accelerometers.

Figure 5:
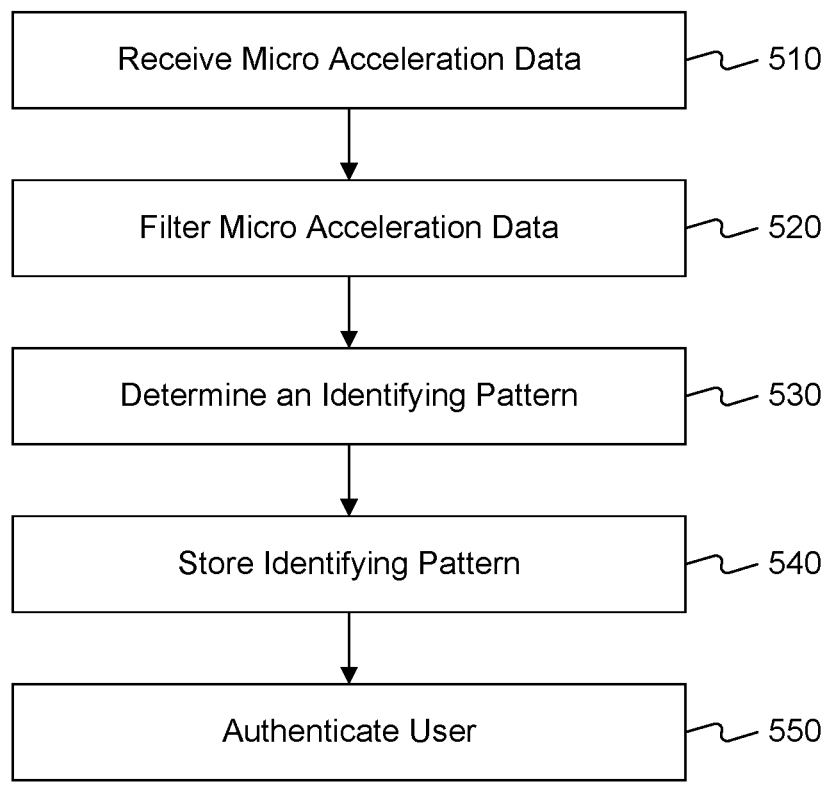
FIG. 5. is a flow chart of an exemplary process for storing an identifying pattern, consistent with the disclosed embodiments.

FIG. 5 is a flowchart of an exemplary process 500 performed by transaction card 120 for storing a user's (e.g., user 160) identifying pattern for use in authenticating the identity of the user (e.g., user 160). It should be understood, however, that the disclosed embodiments are not limited to the processes disclosed herein, and may apply to other authentication events. The exemplary disclosed embodiments may be applicable to any service provided to user 160 where the identity of the user is authenticated. For example, a user's identity may be authenticated for a financial transaction, gaining secured access, sending or receiving confidential information, etc.

Process 500 includes transaction card 120 receiving micro acceleration data associated with movement of user 160 while user 160 possesses transaction card 120 (step 510). Accelerometer(s) 430 measures micro accelerations in three dimensions while accounting for time. In some aspects the received data may be related to user 160's gait (i.e., user 160's manner of walking). Other movements of user 160 generating micro acceleration data may include, but are not limited to, running, standing up, sitting down, moving by wheelchair, moving by a vehicle (e.g., a car, a motorcycle, etc.), other distinct movements, or any other movement associated with the daily life of user 160. A human's (i.e., user 160) daily movements, or accelerations, are linked directly to the individual and can, as disclosed herein, be used as a biometric to uniquely identify the individual.

In step 510, transaction card 120 may also continuously collect micro acceleration data while transaction card 120 is in motion. In some embodiments, transaction card 120 may be in a low power state while the card is not in motion and not collect micro acceleration data while in the low power state. In some embodiments, transaction card 120 may continuously collect micro acceleration data while transaction card 120 is in motion or while micro accelerations exceed a predetermined threshold. For example, transaction card 120 may be in a low power state when stationary. Upon detecting micro accelerations exceeding a predetermined threshold, transaction card 120 may awake from a low power state and measure and record micro accelerations generated from movement of transaction card 120. For example, accelerometer(s) 430 may measure micro accelerations derived from the movement of transaction card 120. Processor(s) 420 may execute software instructions to wake transaction card 120 from a low power state when the micro accelerations measured by accelerometer(s) 430 exceed a predetermined threshold, the threshold being stored in data storage component(s) 410.

Process 500 also includes transaction card 120 processing the generated micro acceleration data to filter the micro acceleration data, wherein the filtered micro acceleration data is representative of user 160 (step 520). For example, user 160 may carry transaction card 120 on their person while driving a car. A car may typically, for example, have 230 hertz base accelerations due to instability of or alignment of the disc on the rotor on car wheel. Filtering process 520 filters out micro acceleration data that is generated from user 160's surrounding environment and not generated by user 160, thereby producing micro acceleration data that is only representative of user 160's motion while in possession of transaction card 120. Additionally or alternatively, the generated micro acceleration data may be sent to, filtered, and/or stored on user device 110, merchant device 130, and/or financial service provider device 140.

Processor(s) 420 can filter the micro acceleration data derived from user 160's motion while possessing transaction card 120, such as by digital signal processing. Processor(s) 420 may therefore include a digital signal processor to perform the filtering. For example, as noted above, the raw acceleration data may include additional acceleration data that is not representative of user 112. Such data may be, for example, generated from accelerations associated with driving a vehicle or accelerations detected from a building's heating, ventilation, and air-conditioning system. The acceleration data may be filtered, so that only accelerations resulting from user 160's motion are collected and processed, for example by using stock linear quadratic estimation, commonly known as Kalman filtering.

The filtered acceleration data is normalized in the time domain and frequency domain. The normalized acceleration data creates a data set of individual time based acceleration vectors which can be codified by assembling the micro acceleration data into normalized Hausdorff space patterns, which are representative of a user's movements and ultimately representative of the user's identity, e.g., user 160 (step 530). This identifying pattern can function as a biometric authentication factor for user 160. The identifying pattern of the user, e.g., user 160 is then stored for later use (step 540). As noted above, the pattern may be stored on transaction card 120, user device 110, merchant device 130 and/or financial service provider device 140. More particularly, the identifying pattern may be stored in data storage component(s) 410 on transaction card 120, in memory associated with general computing components of merchant device 130, in memory associated with general computing components of financial service provider device 140, or memory 220 or database(s) 260 associated with server 200. The identifying pattern stored in any one of these devices, may then be used as a reference pattern to compare filtered micro acceleration data generated contemporaneously from user 160's movement while carrying transaction card 120.

In other embodiments, the micro acceleration data is derived at least in part from the gait of user 160. User 160's gait is a manner of walking that is representative of user 160's identity. More specifically, gait refers to locomotion achieved through the movement of human limbs. Human gait is defined as bipedal, biphasic forward propulsion of center of gravity of the human body, in which there are alternate sinuous movements of different segments of the body with least expenditure of energy. No two individuals have exactly the same gait. Differences in gait patterns are characterized by differences in limb movement patterns, overall velocity, forces, kinetic and potential energy cycles, and changes in contact with the surface (i.e., ground, floor, etc.). Human gaits are the various ways in which a human can move. No two humans are built exactly alike, nor do they move in an identical fashion. Some of the variables distinguishing human gaits from each other include, but are not limited to, forefoot strike (toe-heel: ball of foot lands first), midfoot strike (heel and ball land simultaneously), and heel strike (heel-toe: heel of foot lands, then plantar flexes to ball). An individual's gait is regulated in a highly ordered fashion by the central nervous system. Nerves synapse in a rhythmic fashion that matches the movements seen in behavior. The rhythmic firing is the result of Central Pattern Generators (CPG) that are present throughout nerves. CPGs are biological neural networks that produce rhythmic outputs in the absence of rhythmic input. They are a source of the tightly-coupled patterns of neural activity that drive rhythmic motions like walking, breathing, and chewing. Connections between CPGs controlling each limb influence the coordination between the limbs and hence the gaits in humans. Regardless of whether a motion is voluntary or not, these processes occur. Therefore, CPGs are mostly autonomous to cognition. Because no two individuals are built exactly the same, nor do they have exactly the same CPGs, the gait of an individual can function as a biometric factor for authentication, if the micro accelerations associated with the individual's gait can be measured and manipulated into a pattern representative of the individual.

User 160 can intentionally configure their own identifying pattern by interacting with transaction card 120 through user device 110 to train transaction card 120. In some embodiments, user 160 intentionally configures the identifying pattern. For example, configuring transaction card 120 may involve user 160 carrying transaction card on their person in a variety of places for an extended period of time. User 160 may carry transaction card 120, for example, in their pants pocket, jacket pocket, in their wallet, or in a bag. Transaction card 120 can collect micro acceleration data in all instances in order to identify patterns associated with user 160. User 160 may review the collected and filtered data and confirm that it matches the activities performed by user 160 while carrying transaction card 120, for example, by interacting with transaction card 120 through user device 110 and/or components of server 200, for example, input-output device 210. In other embodiments, user 160 may periodically review the identifying pattern and confirm its accuracy.

In other embodiments, user 160 may intentionally configure multiple identifying patterns associated with multiple users to store on transaction card 120, for example, by interacting with transaction card 120 through user device 110 and/or components of server 200, for example, input-output device 210. For example, in addition to storing user 160's identifying pattern, user 160 may store another trusted person's identifying pattern, such as a spouse, friend, or other family member. Storing multiple identifying patterns on one transaction card 120 allows user 160 to safely lend possession of transaction card 120, knowing that use by unauthorized persons is prevented.

In other embodiments consistent with the present disclosure, the steps of process 500 may be performed by user device 110. For example, user device 110 may be user 160's mobile phone. For example, when user device 110 is picked up by a person and carried, user device 110 can perform process 500 and authenticate the person carrying user device 110 as an authorized user (e.g., user 160) or an unauthorized user (e.g., not user 160, and not someone user 160 has authorized to use device 110).

Figure 6:
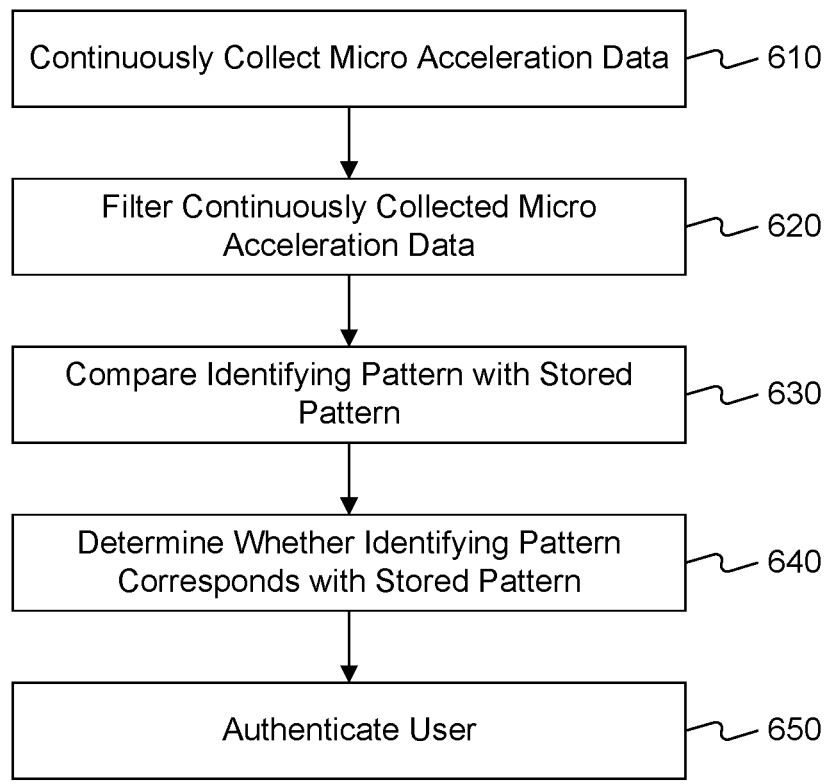
FIG. 6 is a flow chart of an exemplary process for authenticating a user, consistent with the disclosed embodiments.

FIG. 6 is a flowchart of an exemplary process 600 performed by transaction card 120 for authenticating the identity of user 160. In some aspects, process 600 may be performed to authenticate the identity of user 160 prior to a transaction with merchant device 130. In other aspects, process 600 may be performed to authenticate the identity of user 160 who is in possession of transaction card 120.

Process 600 includes transaction card 120 continuously collecting micro acceleration data from accelerometer(s) 430 while transaction card 120 is in motion (step 610). Transaction card 120 may wake from a low power state upon detecting accelerations exceeding a predetermined threshold. For instance, transaction card 120 may wake from a low power state when user 160, picks up transaction card 120, walks with transaction card 120, or performs any other movement while in possession of transaction card 120. While transaction card 120 exceeds a predetermined acceleration threshold, micro acceleration data may be continuously collected.

The continuously collected micro acceleration data is then filtered by processor(s) 420 as previously described to produce an identifying pattern (step 620). The identifying pattern is compared to a stored identifying pattern, the stored identifying pattern being previously configured by and associated with user 160 or associated with other users authorized by user 160 (step 630). Processor(s) 420 may execute software instructions to perform step 630. Based on a comparison between the identifying pattern derived from the continuously collected data and the stored identifying pattern, a determination is made regarding whether the possessor of transaction card 120 is user 160 or is an otherwise authorized user (step 640). For example, the identifying pattern derived from the continuously collected data must match the stored identifying pattern within a confidence interval of, for example, 75%, 80%, 85%, 90%, or higher. In some embodiments, processor(s) 420 may execute software instructions to perform step 640. The stored identifying pattern may be stored in data storage component(s) 410. If it is determined that the possessor of transaction card 120 is an authorized user, then the authorized user of transaction card 120 is authenticated for use of transaction card 120 (step 650). Processor(s) 420 may execute software instructions to perform step 650. It the possessor of transaction card 120 is not user 160, transaction card 120 may notify user 160, for example, via a push notification, which may include a text message to user device 110 informing user 160 of the un-authenticated possession of transaction card 120. User 160 may respond to the push notification by authorizing the third party possession of transaction card 120.

In some embodiments, if possession of transaction card 120 is not authorized by user 160, user 160 may elect to temporarily freeze the financial account associated with transaction card 120 while transaction card 120 is being carried by an unauthorized user. For example, the received text message on user device 110 informing user 160 that transaction card 120 is in the possession of an unauthorized user may include selectable options giving user 160 a choice of potential actions. User 160 may respond to the text message with instructions sent to financial service provider device 140 to temporarily freeze a financial account associated with user 160 and transaction card 120. User 160 may elect to terminate the association between transaction card 120 and a financial account associated with user 160 and transaction card 120. The options may further include options for user 112 to instruct financial service provider to supply user 160 with a new transaction card.

In other embodiments, transaction card 120 may enter a sleep/off mode and require authorization for continued use after being left unused for a period of time, for example, several hours, days, or weeks. For example, when user 160 picks up transaction card 120, accelerometer(s) 430 on transaction card 120 measures micro accelerations exceeding a predetermined threshold and data storage component(s) 410 begins collecting micro acceleration data, processor(s) 420 filters the micro acceleration data consistent with disclosed embodiments, and determines an identifying pattern from the filtered micro acceleration data. If the filtered pattern matches a stored pattern associated with an authorized user, i.e. user 160, then user 160 is authorized to use transaction card 120. For example, user 160 may use transaction card 120 for a financial transaction. If, upon collecting and filtering the micro acceleration data, the determined identifying pattern does not match user 160 or a different user who user 160 has authorized to have possession of transaction card 120, then a push notification may be sent to user device 110 as previously described.

In other embodiments, the authentication processes disclosed herein may be applied to user device 110, which may be a smart phone or mobile device. For example, user device 110 may perform all of the steps disclosed herein as performed by transaction card 120. For example, accelerometers(s) 370 may measure micro accelerations, processor(s) 310 may filter micro acceleration data to determine an identifying pattern and execute software instructions to compare the identifying pattern derived from the measured micro accelerations with an identifying pattern stored in memory 340. Instead of sending a push notification to user device 110 when the determined identifying pattern does not match the stored identifying pattern, user device 110 may lock itself and thereby prevent any further use of device 110 until device 110 is back in the possession of an authorized user, e.g., user 160 or a user given permission from user 160 to possess device 110.

In other embodiments, the identifying pattern may be used as one factor in a multi-factor authentication. For example, the identifying pattern may be used in combination with other factors known to those skilled in the art.

The disclosed embodiments provide improvements to multi factor authentication by using accelerations derived from a user's gait as a biometric for authentication. Unlike a fingerprint, facial, or retina scan, a user's gait cannot easily be hacked, for example, by taking a picture of it. In addition, a user's gait cannot easily be captured and replicated. The disclosed embodiments enable more secure authentication as compared to other biometric factors. For example, biometrics derived from a facial scan may be hacked by a third party with a picture of a user's face. Biometrics derived from a user's gait, consistent with the disclosed embodiments, cannot be replicated based on a picture or even video. Additionally, the disclosed embodiments provide authentication mechanisms that are more convenient and less intrusive to use compared to other biometrics. Existing authentication using biometrics requires active participation by the user. For example, a user must correctly orient their head for an iris scan. The disclosed embodiments provide improved and less obtrusive authentication mechanisms which authenticate the user without any active participation by the user. The user must simply possess transaction card 120 or user device 110. In some embodiments, the possessor of transaction card 120 is constantly being authenticated. This is an improvement over traditional two factor authentication schemes. For example, traditional credit cards require the user to possess the card and know the personal identification number (PIN). This two factor authentication scheme fails when a third party gains possession of the card and knowledge of the PIN. The disclosed embodiments provide improvements to the integrity of two factor authentication schemes by replacing the knowledge factor with a biometric factor derived from the user's gait. A third party cannot replicate a user's gait.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software Moreover, white illustrative embodiments have been described herein, the scope includes any and all embodiments having equivalent elements, modifications, omissions, combinations (e.g., of aspects across embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

The invention claimed is:

1. A system for authorizing use of an electronic transaction card, comprising:
   one or more memory devices storing software instructions;
   one or more processors configured to execute the software instructions to perform operations comprising:
   receiving micro acceleration data collected by an accelerometer of the electronic transaction card;
   filtering the received micro acceleration data to exclude raw acceleration data;
   determining, based on the filtered micro acceleration data, one or more normalized Hausdorff space patterns;
   determining, based on the normalized Hausdorff space patterns, a unique identifying pattern representative of a movement pattern of a user associated with the electronic transaction card;
   comparing the unique identifying pattern with a reference pattern; and
   authorizing, based on the comparison, use of the electronic transaction card.

2. The system of claim 1, wherein the filtering comprises using stock linear quadratic estimation.

3. The system of claim 1, wherein:
   the micro acceleration data is first micro acceleration data;
   the normalized Hausdorff space patterns correspond to first normalized acceleration data; and
   the reference pattern comprises a pattern determined by:
   receiving second micro acceleration data collected by the accelerometer;
   filtering the received second micro acceleration data to exclude accelerations resulting from other than user movement;
   determining, based on the filtered second micro acceleration data, second normalized acceleration data; and determining, based on the second normalized micro acceleration data, the unique identifying pattern representative of a movement pattern of the user.

4. The system of claim 3, wherein the reference pattern comprises a pattern determined by receiving a confirmation from a user device associated with the electronic card.

5. The system of claim 1, wherein the reference pattern comprises a pattern stored in a data storage component of the electronic transaction card.

6. The system of claim 5, wherein the reference pattern comprises one of a plurality of stored reference patterns for users associated with the electronic transaction card.

7. The system of claim 1, wherein filtering the received micro acceleration data comprises excluding data associated with accelerations resulting from other than user movement.

8. The system of claim 1, wherein determining the unique identifying pattern comprises determining an identifying pattern representative of a gait pattern of the user.

9. The system of claim 1, the operations further comprising sending the micro acceleration data to a remote device.

10. A method for authorizing use of an electronic transaction card, comprising:
receiving micro acceleration data collected by an accelerometer of an electronic transaction card;
filtering the received micro acceleration data to exclude raw acceleration data;
determining, based on the filtered micro acceleration data, one or more normalized Hausdorff space patterns;
determining, based on the normalized Hausdorff space patterns micro, a unique identifying pattern representative of a movement pattern of a user associated with the electronic transaction card;
comparing the unique identifying pattern with a reference pattern; and
authorizing, based on the comparison, use of the electronic transaction card.

11. The method of claim 10, further comprising:
determining, based on the comparison, that the user is an authorized user of the card; and
upon determining that the user is an authorized user of the card, approving a financial transaction.

12. The method of claim 10, further comprising:
receiving reference micro acceleration data;
determining the reference pattern, based on the reference micro acceleration data; and
storing the reference pattern into a storage device.

13. The method of claim 12, wherein receiving reference micro acceleration data comprises:
receiving the reference micro acceleration data from a user device.

14. The method of claim 12, wherein receiving the reference micro acceleration data comprises:
receiving the reference micro acceleration data from the electronic transaction card.

15. The method of claim 14, wherein receiving the reference micro acceleration data comprises receiving reference micro acceleration data continuously collected while the electronic transaction card is in motion.

16. The method of claim 10, further comprising:
determining, based on the comparison, that the user is other than an authorized person to possess the electronic transaction card.

17. The method of claim 16, further comprising:
upon determining that the user is other than the authorized person to possess the electronic transaction card, transmitting a notification to a device associated with the electronic transaction card.

18. The method of claim 17, further comprising:
receiving, from the device associated with the electronic transaction card, a response authorizing a use of the electronic transaction card; and
approving a financial transaction.

19. A non-transitory computer-readable storage medium storing instructions for authentication using an electronic transaction card, wherein when executed by one or more processors, the instructions cause a system to perform operations comprising:
receiving micro acceleration data collected by an accelerometer of the electronic transaction card;
determining, based on micro acceleration data, one or more normalized Hausdorff space patterns;
determining, based on the one or more normalized Hausdorff space patterns, a unique identifying pattern representative of a movement pattern of a user associated with the electronic transaction card;
comparing the unique identifying pattern with a reference pattern; and
authorizing, based on the comparison, a use of the electronic transaction card.

* * * * *